Feb. 5, 1963   J. R. MOSS   3,076,351
INDEXING MECHANISM
Filed April 7, 1960

INVENTOR.
JAMES R. MOSS
BY Whittemore
Hulbert & Belknap
ATTORNEYS

United States Patent Office 3,076,351
Patented Feb. 5, 1963

3,076,351
INDEXING MECHANISM
James R. Moss, Mount Clemens, Mich., assignor to Holley Carburetor Company, Van Dyke, Mich., a corporation of Michigan
Filed Apr. 7, 1960, Ser. No. 20,637
8 Claims. (Cl. 74—394)

The present invention relates to indexing mechanism and refers more specifically to improved cam and gear intermittent motion structure.

Cam and gear intermittent motion structures wherein an output shaft is rotated intermittently by a continuously rotating drive shaft have previously been known. However cam and gear intermittent motion structures have not in the past been used to the fullest extent possible due to deficiencies in the particular cam and gear structures provided.

For example, such structures have often included elements causing unbalanced rotation which prevents their use at higher operating speeds due to the radial forces developed thereby. High speed operation of such previous structures has also been prevented to some extent due to the large stopping and starting torque of the structures.

In addition with many of the previous cam and gear intermittent motion structures it has been difficult or impossible to obtain a desired ratio of input to output speed for particular uses. Further such structures have often been of relatively large over-all dimensions and have been difficult to fabricate and relatively complicated.

It is therefore a purpose of the present invention to provide cam and gear intermittent motion structure capable of operation at high speeds.

Another object is to provide cam and gear intermittent motion structure wherein unbalanced rotation is eliminated.

Another object is to provide cam and gear intermittent motion structure having relatively low starting and stopping torque.

Another object is to provide a cam and gear intermittent motion structure wherein different ratios of input to output speed may be obtained within the structure.

More specifically it is an object to provide cam and gear intermittent motion structure comprising a driver gear, a cam gear and a follower gear positioned adjacent each other in driven relation to the driver gear, said follower gear including means thereon for driving an output shaft in accordance with the position of a cam attached to said cam gear.

Still more specifically it is an object to provide cam and gear intermittent motion structure comprising a rotatably mounted driving gear, a cam gear positioned in driven relation to said driving gear and including a cam mounted thereon for rotation therewith about a fixed axis parallel to the axis of rotation of the driving gear, a follower gear also in driven relation to the driving gear and mounted on an axis for rotation by the driving gear and for relative circumferential movement about an axis through the center of rotation of the driving gear, said follower gear including a follower on one side thereof adapted to continuously engage said cam and having on the other side thereof and secured thereto for rotation therewith a pulley, an output means comprising a pulley fixedly secured to an output shaft and a belt extending between the follower pulley and the output pulley whereby on rotation of the driving gear the cam and cam gear and the follower gear and pulley are all caused to rotate to produce rotation of the output pulley and shaft until the follower on the follower gear engages a predetermined cam surface on the rotating cam such that the follower gear is caused to remain substantially stationary for a period of rotation of the driving gear whereby intermittent rotary motion of the output shaft is provided during continual rotation of the drive gear.

Another object is to provide cam and gear intermittent motion structure as set forth above wherein the cam gear, follower and pulley are mounted on an arm pivotal about the axis of rotation of the driving gear and wherein resilient means are provided urging the follower against the cam.

Another object is to provide cam and gear intermittent motion structure which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures a specific embodiment of the cam and gear intermittent motion structure of the invention will now be discussed.

Figure 1:
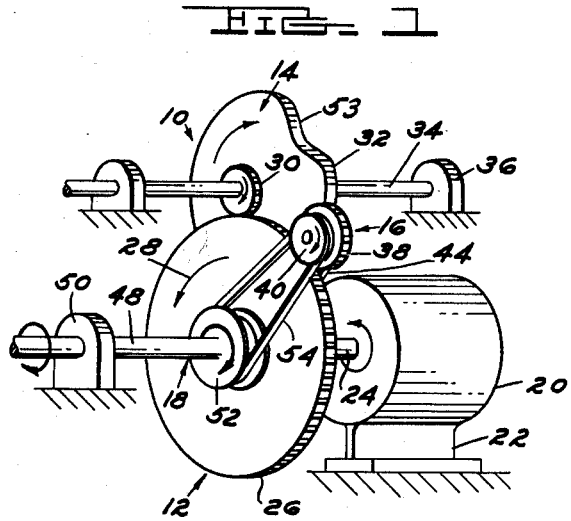
FIGURE 1 is a diagrammatic perspective view of cam and gear intermittent motion structure according to the invention.

As shown in FIGURE 1 the cam and gear intermittent motion structure generally indicated 10 comprises driving means 12, cam means 14, follower means 16 and output means 18. In accordance with the invention on continuous rotation of driving means 12 the cam means causes the follower means to be intermittently rotated to produce intermittent rotation of output means 18. The intermittent rotation of output means 18 is due to the pivotal mounting of follower means 16 about drive shaft 24 and the urging of the follower means to pivot about the drive shaft 24 in accordance with the shape of the cam means 14.

More specifically drive means 12 comprises motor 20 fixedly secured to rigid mounting 22, drive shaft 24 and driving gear 26. As will be understood on operation of motor 20 the drive shaft 24 and driving gear 26 attached to drive shaft 24 will be caused to rotate in, for example, the direction indicated by arrow 28.

Cam means 14 comprises cam gear 30 having cam 32 secured thereto for rotation therewith. Cam gear 30 as illustrated is rotatably mounted in mesh with driving gear 26 in a substantially fixed position on shaft 34 which is journaled in support 36.

Follower means 16 comprises follower gear 38 having follower pulley 40 fixedly secured to one side thereof for rotation therewith and having follower 42 secured to the other side thereof as shown. Follower means 16 further includes a pivot arm 44 and bias spring 46.

Figure 2:
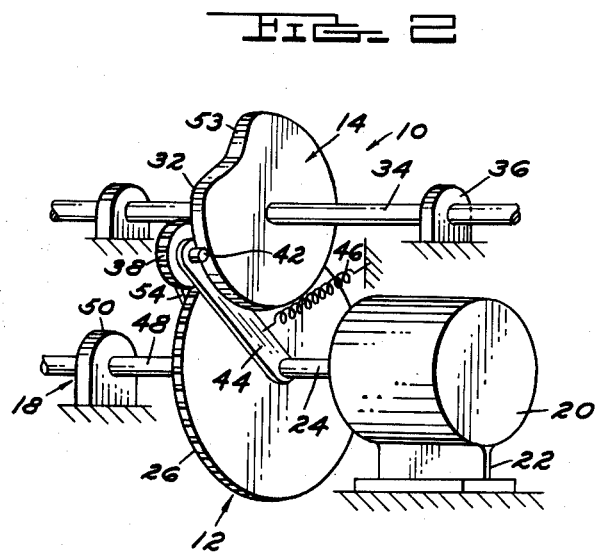
FIGURE 2 is a second perspective view of the cam and gear intermittent motion structure illustrated in FIGURE 1.

Pivot arm 44 as illustrated is pivotal about the axis of rotation of output shaft 24 of drive means 12 and thus supports the follower gear 38 in mesh with the driving gear 26 and allows circumferential movement of the follower gear 38 about the periphery of the driving gear 26. In operation the spring 46 biases the pivot arm 44 so that the follower 42 is held against the periphery of cam 32 of cam means 14 as shown best in FIGURE 2.

Drive means 18 as illustrated comprises output shaft 48 journaled for rotation in a substantially fixed support 50, output pulley 52 secured to shaft 48 for rotation therewith and drive belt 54 extending between the follower pulley 40 and the output pulley 52 and operable to cause rotation of the output pulley 52 on rotation of the follower pulley 40 as will be understood. It will be particularly noted that the drive shaft 24 from the motor 20 and the output shaft 48 while they may be in line are separated axially.

In over-all operation of the cam and gear intermittent motion structure described above the motor 20 of the driving means 12 is operated to produce continual rotary motion of shaft 24 which causes intermittent rotary motion of output shaft 48. To accomplish this result the driving gear 26 is rotated with shaft 24. Rotation of driving gear 26 will cause rotation of cam gear 30 about fixed shaft 34 and rotation of the gear 38 on pivot arm 44 in the usual manner since the cam and follower gears are meshed with the driving gear 26 as shown best in FIGURE 1.

During rotation of follower gear 38 the follower 42 is held in contact with the periphery of cam 32 by means of spring 46 as shown. Thus the axis of rotation of the follower gear 38 is fixed angularly with respect to the axis of rotation of the drive gear 26 by means of cam 32 during a portion of the rotation of driving gear 26 and at this time rotates in the manner in which it would if the axis of rotation thereof were fixed instead of movable angularly about the axis of rotation of the shaft 24.

As shown in the figures the arcuate slot or recess 53 is provided in the periphery of cam 32. When the follower is caused to move into the recess 53 during the rotation of driving gear 26 the rotation of the follower gear 38 will tend to cease since the gear 38 will be moved in the same direction as the circumference of the driving gear 26 is moved for a short time by the movement of the pivot arm 44 due to spring 46 which is allowed due to the recess 53 in cam 32.

With proper contouring of the slot or recess 53 in the cam 32 the follower gear 38 can be made to roll with the driving gear 26 and pivot about the input shaft 24 to cause the follower pulley 40 to move in such a manner as to prevent the motion thereof from being transmitted to the output pulley 52 for a predetermined portion of each rotation of the driving gear 26.

Thus it will be seen that according to the invention there is provided cam and gear intermittent motion structure in which unbalanced rotation is eliminated and which has low starting and stopping torque since the moving parts thereof may have relatively low inertia as compared to previous cam and gear intermittent motion structures.

In addition it will be readily apparent to those in the art that the intermittent motion structure described is extremely flexible in that the desired ratio of input to output speed can be obtained within the structure and that the structure can be of relatively small over-all dimensions.

Also fabrication of the disclosed structure is relatively simple in comparison to similar structures requiring a fixed gear and having the remaining mechanism rotating entirely around the fixed gear.

The drawings and the foregoing specification constitute a description of the improved indexing mechanism in such full, clear, concise and exact terms as to enable any person skilled in the art to practice the invention, the scope of which is indicated by the appended claims.

What I claim as my invention is:

1. Intermittent motion structure comprising a rotatable drive shaft, a drive gear rigidly secured to said drive shaft for rotation therewith, a second shaft positioned parallel to and laterally offset from said drive shaft, a cam gear mounted on said second shaft for rotation and in engagement with said drive gear, a cam having a radially variable cam surface secured to said cam gear for rotation therewith, a pivot arm positioned between said drive gear and cam one end of which is sleeved over said drive shaft for pivotal movement thereabout, a cam follower member secured to one side of the other end of said pivot arm engaged with said cam surface, and a follower gear supported for rotation on the other side of the other end of the pivot arm and engaged with the drive gear whereby on continuous uniform rotation of the drive gear intermittent rotary motion of the follower gear is produced.

2. Structure as set forth in claim 1 and further including resilient means biasing said pivot arm about said drive shaft to maintain the follower member in contact with the cam surface.

3. Structure as set forth in claim 1 wherein said cam surface has a concave section.

4. Structure as set forth in claim 1 wherein the cam gear is small relative to the cam so that the cam overlaps the drive gear and wherein the follower gear is also small relative to the drive gear.

5. Intermittent motion structure comprising a rotatable drive shaft, a drive gear rigidly secured to said drive shaft for rotation therewith, a second shaft positioned parallel to and laterally offset from said drive shaft, a cam gear mounted on said second shaft for rotation and in engagement with said drive gear, a cam having a radially variable cam surface secured to said cam gear for rotation therewith, a pivot arm positioned between said drive gear and cam one end of which is sleeved over said drive shaft for pivotal movement thereabout, a cam follower member secured to one side of the other end of said pivot arm engaged with said cam surface, a follower gear supported for rotation on the other side of the other end of the pivot arm and engaged with the drive gear, a follower pulley secured to the follower gear on the side thereof remote from the pivot arm for rotation therewith, a rotatably mounted output shaft, an output pulley rigidly secured to the output shaft for rotation therewith and an endless belt extending between said pulleys whereby intermittent rotary motion of said output shaft is produced on continuous uniform rotation of said drive shaft.

6. Structure as set forth in claim 5 wherein said output shaft is offset transversely of the axis of rotation of said drive shaft.

7. Intermittent motion structure comprising a rotatable drive shaft, a drive gear rigidly secured to said drive shaft for rotation therewith, a second shaft positioned parallel to and laterally offset from said drive shaft, a cam gear mounted on said second shaft for rotation and in engagement with said drive gear, a cam having a radially variable cam surface secured to said cam gear for rotation therewith, a pivot arm operably associated with said drive gear and cam one end of which is secured to said drive shaft for pivotal movement thereabout, a cam follower member secured to the other end of said pivot arm engaged with said cam surface, resilient means secured to said pivot arm for biasing the pivot arm about the drive shaft to maintain the follower member in contact with the cam surface, and a follower gear supported for rotation on the other end of the pivot arm and engaged with the drive gear whereby on continuous uniform rotation of the drive gear intermittent rotary motion of the follower gear is produced.

8. Intermittent motion structure comprising a rotatable drive shaft, a drive gear rigidly secured to said drive shaft for rotation therewith, a second shaft positioned parallel to and laterally offset from said drive shaft, a cam gear mounted on said shaft for rotation and in engagement with said drive gear, a cam having a radially variable cam surface secured to said cam gear for rotation therewith, a pivot arm positioned between said drive gear and cam one end of which is sleeved over said drive shaft for pivotal movement thereabout, a cam follower member secured to one side of the other end of said pivot arm engaged with said cam surface, resilient means secured to said pivot arm for biasing said pivot arm about said drive shaft to maintain the follower member in contact with the cam surface, a follower gear supported for rotation on the other side of the other end of the pivot arm and engaged with the drive gear, a follower pulley secured to the follower gear on the side thereof remote from the pivot arm for rotation therewith, a rotatably mounted output shaft, an output pulley rigidly secured to the output shaft for rotation therewith and an endless belt extending between said pulleys whereby intermittent rotary motion of said output shaft is produced on continuous uniform rotation of said drive shaft.

References Cited in the file of this patent

UNITED STATES PATENTS

| | | |
|---|---|---|
| 1,975,126 | Scholin | Oct. 2, 1934 |
| 2,547,634 | Faustini | Apr. 3, 1951 |
| 2,655,817 | Armelin | Oct. 20, 1953 |
| 2,845,808 | Stover | Aug. 5, 1958 |
| 2,969,910 | Reuter | Jan. 31, 1961 |